US005092912A

United States Patent [19]

Korman

[11] Patent Number: 5,092,912
[45] Date of Patent: Mar. 3, 1992

[54] POLLUTION ABATEMENT METHOD

[76] Inventor: David J. Korman, 3131 Espanol Dr., Las Vegas, Nev. 89121-4224

[21] Appl. No.: 619,344

[22] Filed: Nov. 29, 1990

[51] Int. Cl.⁵ .......... B01D 47/00

[52] U.S. Cl. .......... 55/85; 55/89; 55/91; 55/92; 55/231; 55/228; 55/259; 55/400; 55/404

[58] Field of Search .......... 55/231, 228, 91, 92, 55/85, 89, 231, 228, 259, 400, 404

[56] References Cited

U.S. PATENT DOCUMENTS 3,538,657 11/1970 Macrow .......... 55/231

*Primary Examiner*—Bernard Nozick

[57] ABSTRACT

The invention is an air pollution abatement system which embodies four different phases. The phases are: the primary impinger section, which removes most of the contaminants by variable density rotational impingement combined with a degreasing solution; the turbo impinger section, which extracts the residual moisture and aerosols introduced within the primary impinger section; the deluge/saturator section, which scrubs the gas with water or chemicals and finally the dehydrator section which hydroextracts the moisture and introduces static electricity to trap any residual micron-sized particulates prior to exhaustion into the atmosphere. The system, while operating, is continuously self-cleaned and computer system managed.

18 Claims, 11 Drawing Sheets

POLLUTION ABATEMENT METHOD

BACKGROUND OF INVENTION

1. Field of invention

The field of the invention embraces air pollution abatement from fixed source locations that produce airborne contaminants.

Existing air pollution abatement uses several devices in various combinations for the treatment of a variety of raw stack gases. Stack gases may be produced from a combustion source, a chemical process, a mechanical process or any source that introduces contaminated aerosols, particulates or noxious gases into the atmosphere.

2. Examples of equipment presently in use (1) Bag houses: Baglike devices made to fit over outlets from a pollution source. The bags trap larger particles and let the air pass through the interstices of the bags fabric. The bags may be removed and replaced when necessary.

(2) Mechanical filters: The filters are made in various densities, thicknesses and sizes, and are usually located in the duct/s exhausting the raw stack gases. The filters trap and impinge particles in the raw stack gases.

(3) Impingers: Impingers are similar to mechanical filters and have the same basic functions and results of mechanical filters.

(4) Cyclonal chambers: The chambers are cylindrical in shape and may be used as a saturator chamber and/or a particulate/dust removal system.

(5) Venturis: A device where the throat of a pipe is narrowed sufficiently to cause a decrease in pressure and an increase in the rate of flow of gas or air passing through the pipe. At the point where the pipe is narrowed, water may be introduced to scrub the gas. The throat of the pipe is usually of a variable and adjustable diameter.

(6) Electrostatics: A mechanical filter with an electromagnetic field that produces a stationary positive field that impinges tiny particles which are typically negatively charged.

(7) After burners: High temperature combustion to remove pollutants and gases by incineration.

SUMMARY OF INVENTION

The system is designed to remove the flue gas pollutants from a combustion source such as a commercial or industrial processing source.

The primary impinger scrubbing section has two replaceable, 5 segmented wheel filters which operate in tandem and are both motorized and are individually and interdependantly capable of rotational velocities in excess of 1000 rpms, clockwise and counter-clockwise. The impinger leading surfaces, interstices and trailing surfaces are continuously saturated with a biodegradeable and recyclable solution. Rotational velocities, direction and solution management are all computer controlled. As the gas enters this chamber, it is scrubbed and washed and the impinged material is removed by centrifugal force. The impellar, located at the far end of the primary impinger chamber; maintains the necessary pressure and gas flow rate within the system.

The solution used in the primary impinger section will be reticulated from a wet section located beneath the impinger chamber. The chemistry management sludge removal and makeup systems will be computer managed.

All systemic requirements such as velocities, rotational direction, gas pressure and flow rate, will be a result of (1) Pollutants (2) Variable impinger density settings (3) Sloution flow rate and chemistry (4) Raw stack gas velocity.

After passing through the primary impinger section, the gas will be spun dry in the turbo impinger section. This prepares the gas for its' entry into the saturation and dehydration section.

The gas will then enter a cyclonal tower for water or chemical saturation. As the gas travels upwards it will wrap around a vertical shower stack. The shower stack will saturate the ascending gases with solution or water which is supplied from a wet section tank located beneath the saturator chamber.

After this the saturated gas will enter a plenum where outside makeup air may be blended (added) to the existing flow for systemic balancing when required.

The blended gas then enters the hydroextractor module through a motorized spin vane and is drawn into a rotating impinger and demister chamber for hydroextraction and depositing of the solution on the inner module chamber walls. The spin vane is also capable of adjusting the gas flow velocities.

The impinged solution then travels back to the lower wet section gravitationally from the dehydrator chamber walls.

The rotating impinger will produce static electricity due to its intrinsic design, which utilizes polymer based synthetic fibers. The static electricity will provide electro magnetic impingement of micron sized particulates.

After this section, the treated and cleaned gases will be released to the atmosphere.

DRAWINGS DESCRIPTIONS

Figure 4B:
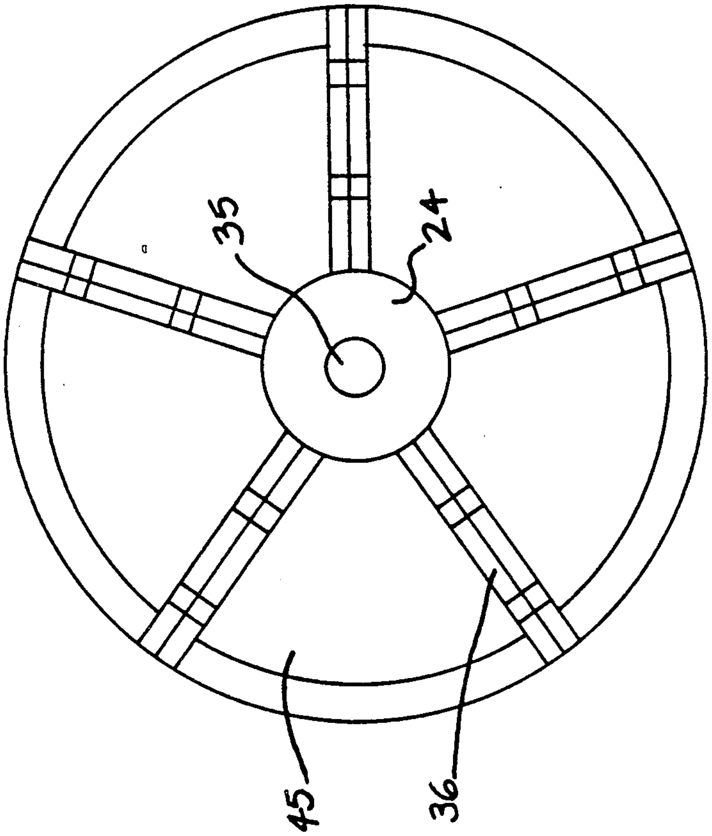
Figure 4A:
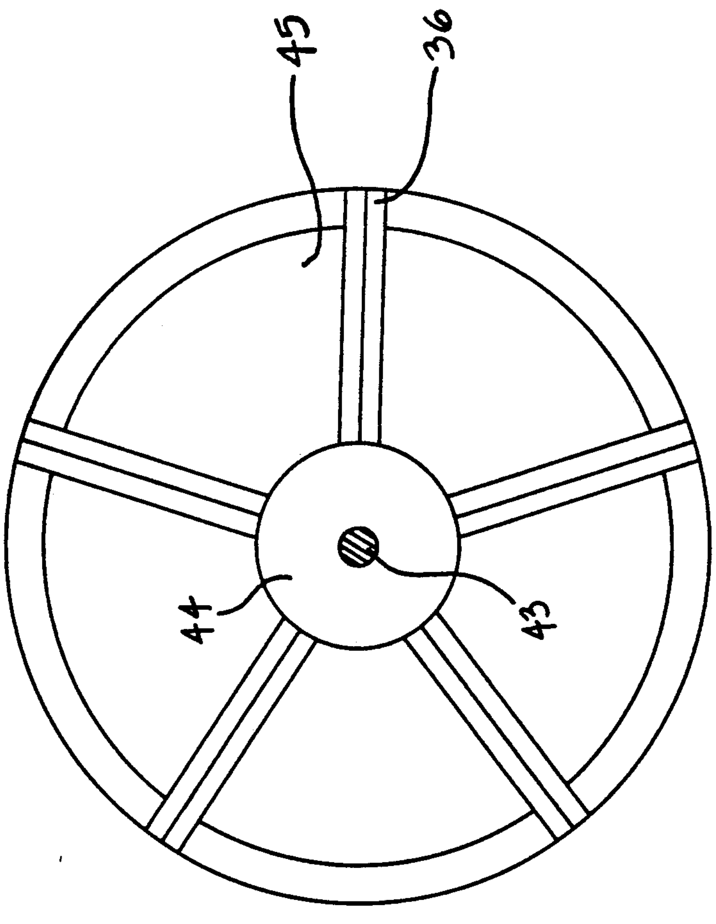
Figure 5:
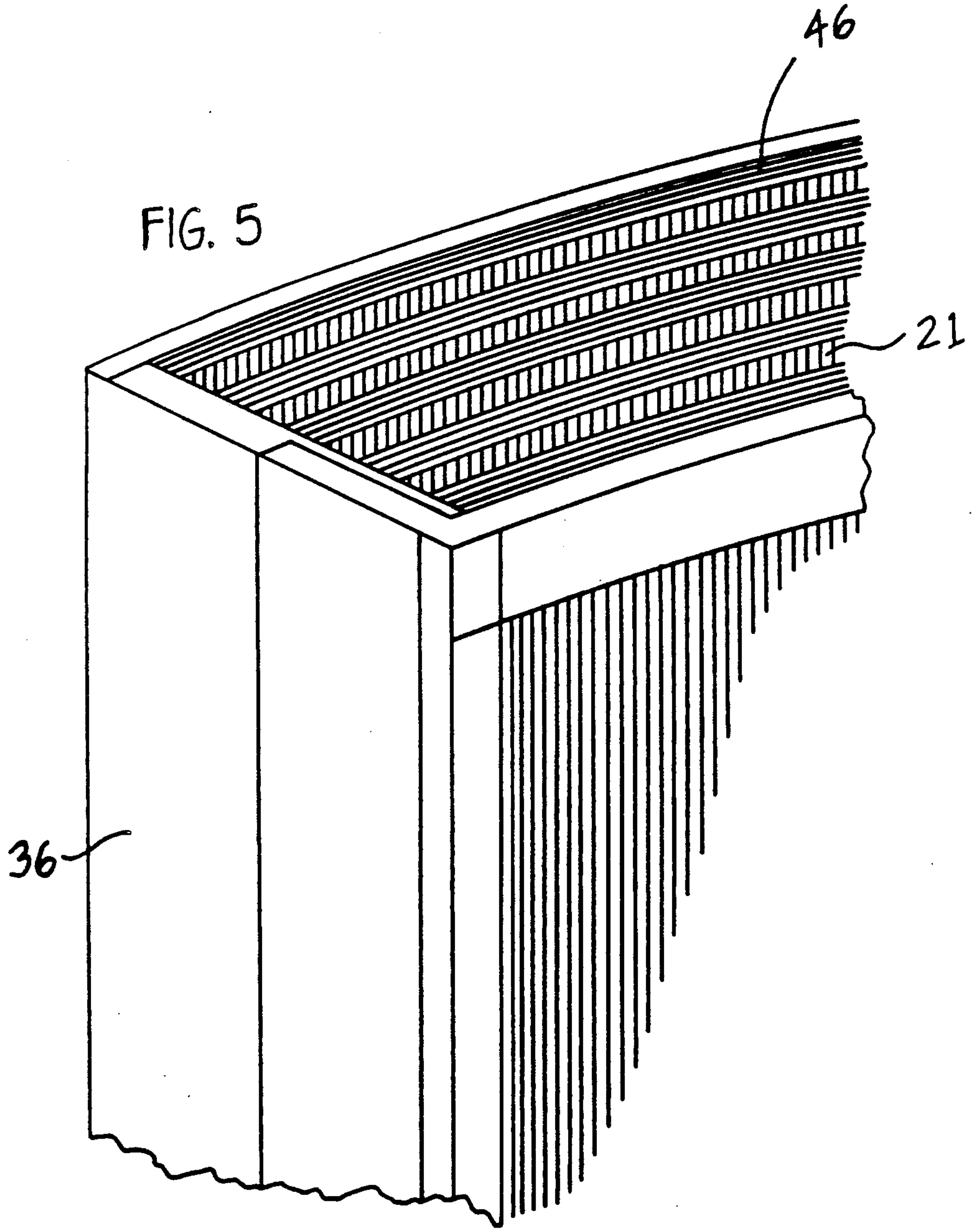
Figure 6A:
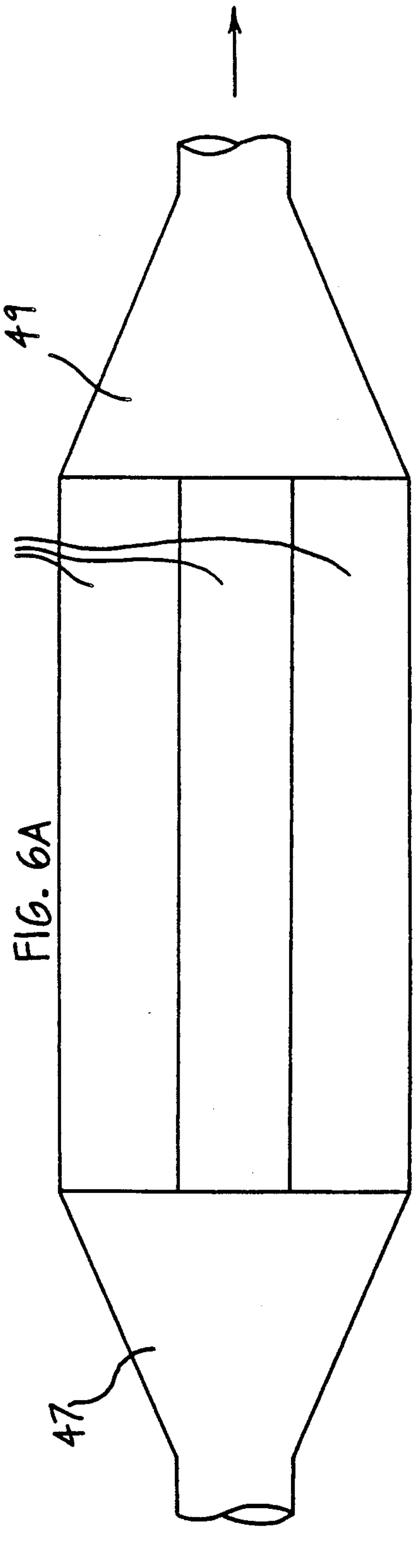
Figure 6B:
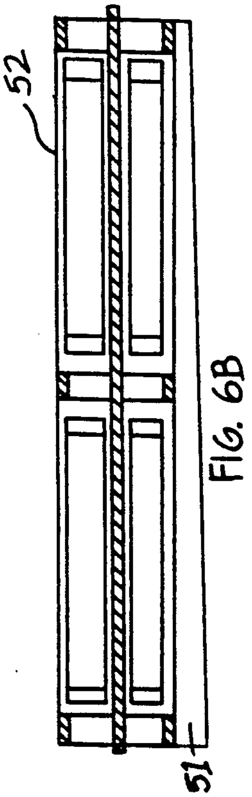
Figure 6C:
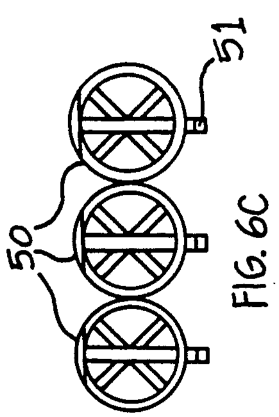
Figure 7B:
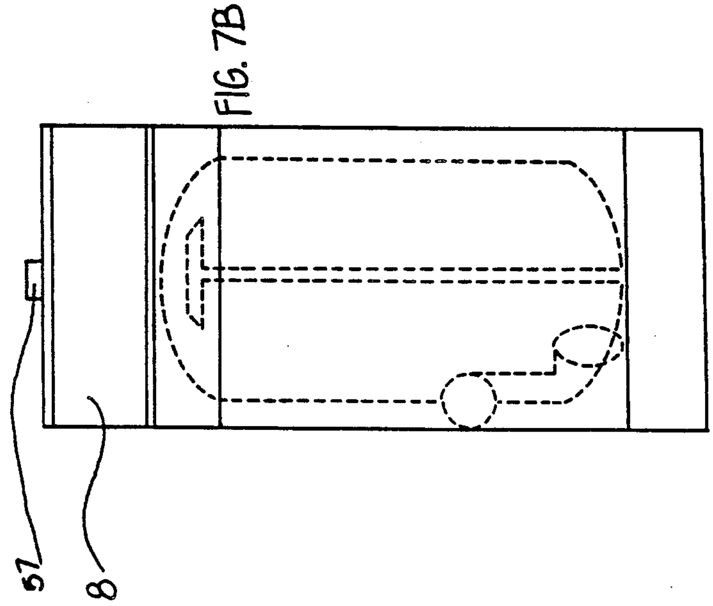
Figure 7A:
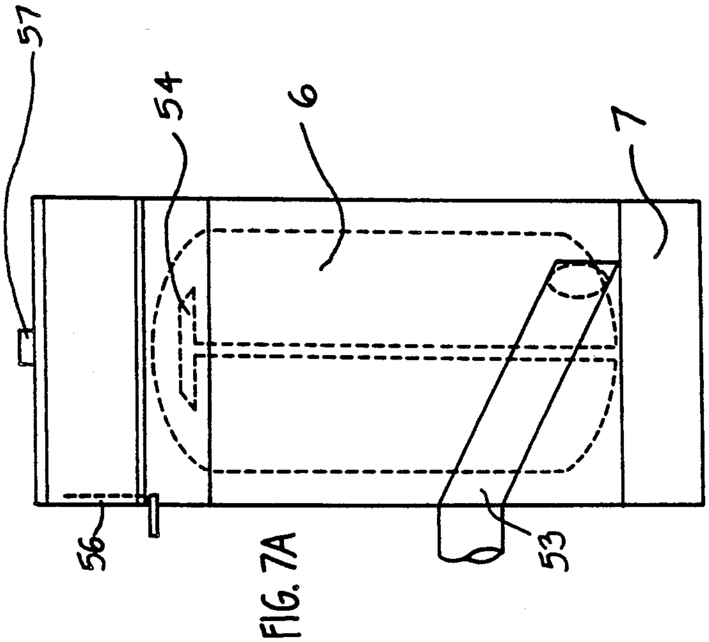
Figure 7C:
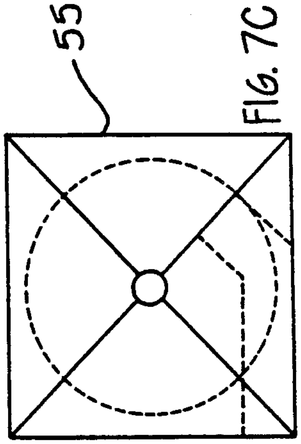
Figure 8:
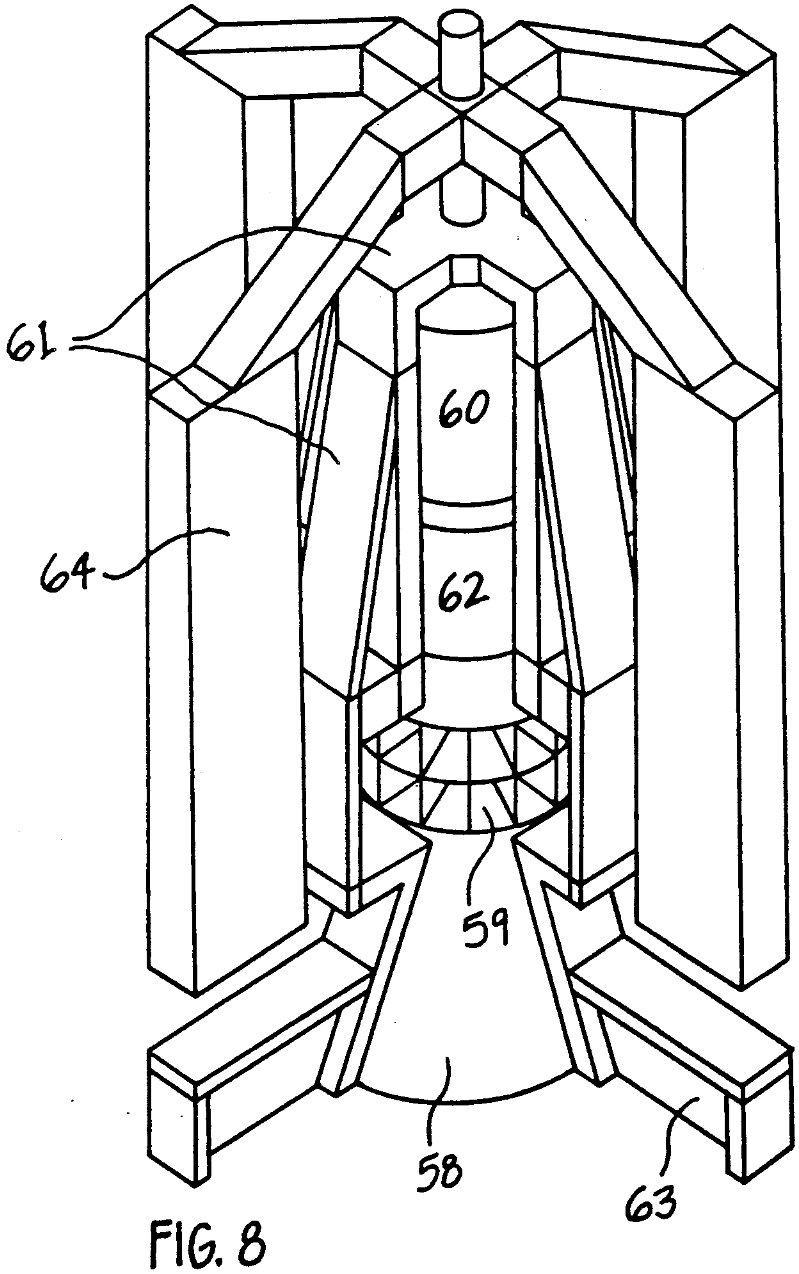
Figure 9:
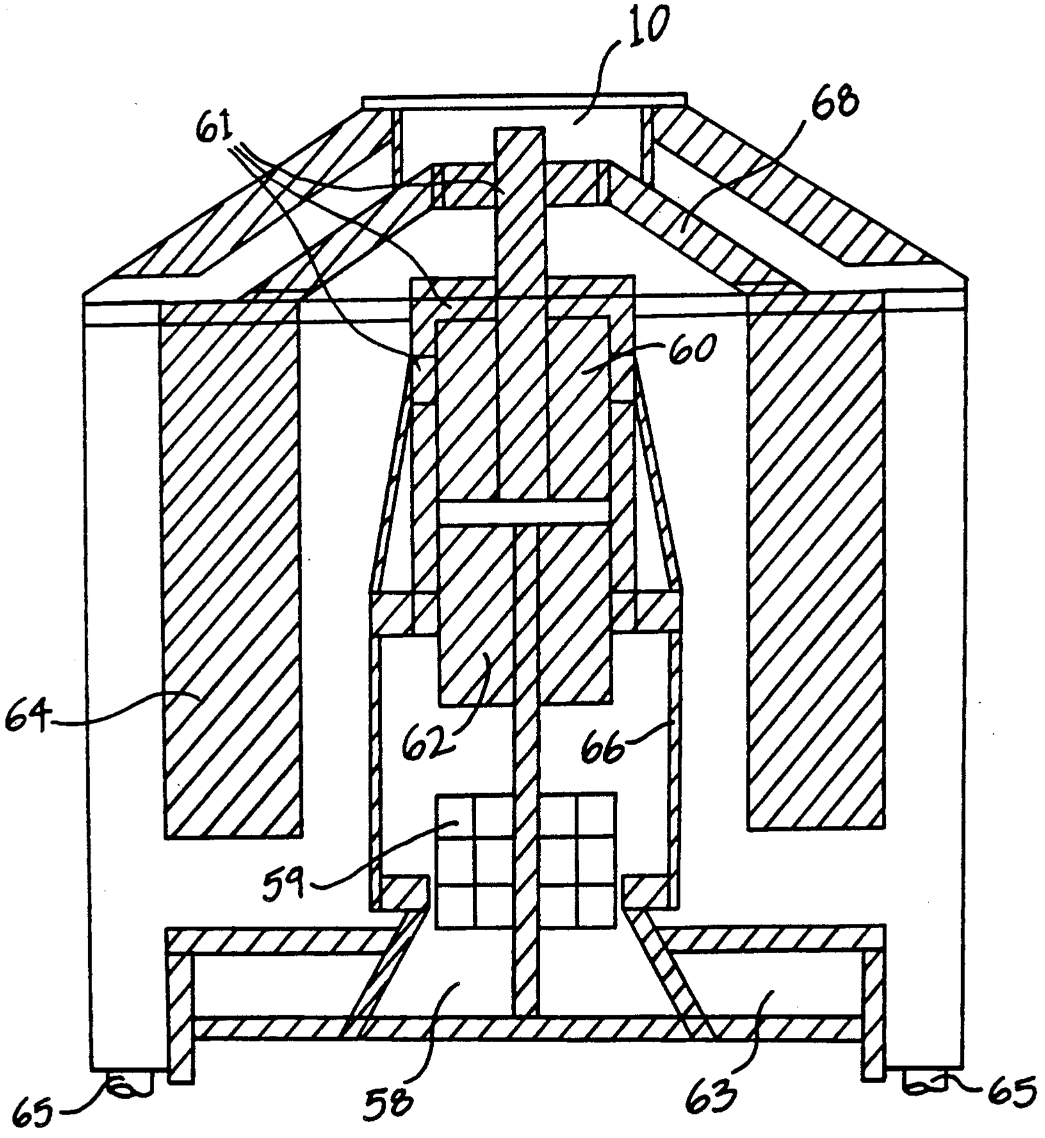
Figure 10:
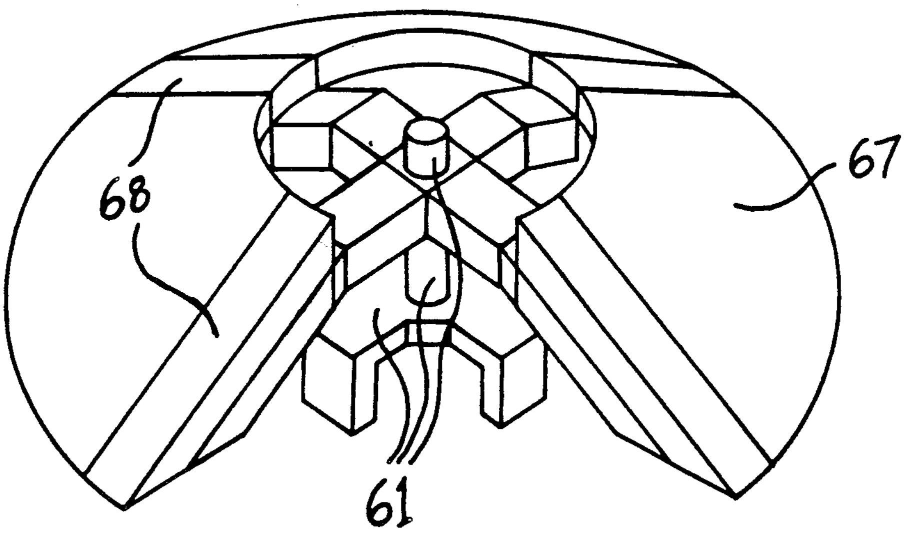
Figure 11:
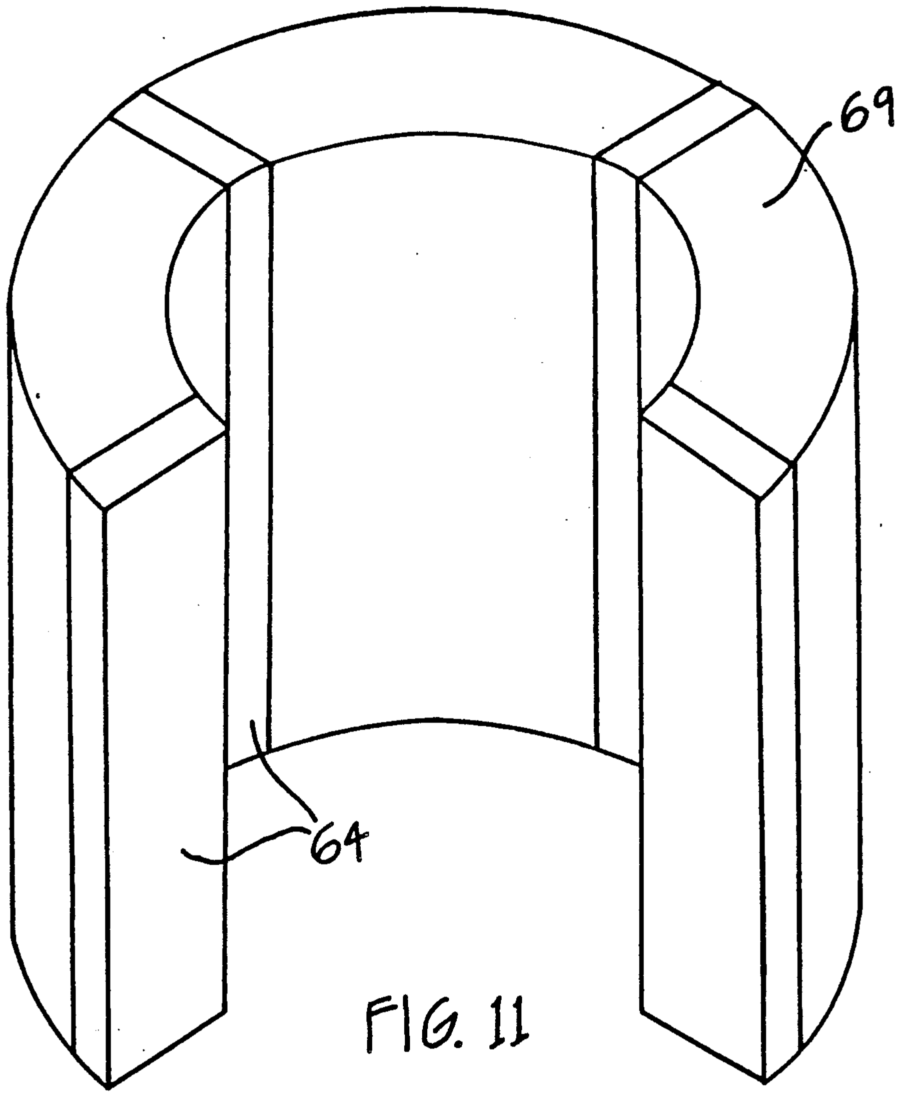

FIGS. 4A and 4B consist of back and front elevations of the primary impinger filter wheels;

FIG. 5 is a broken out axiometric view of a filter segment (5 per primary impinger wheel);

FIGS. 6A, 6B, and 6C are a plan view of side by side turbo impingers (3 per machine), a cross sectional view of the left front impinger (all 3 are identical except for position), and an end upstream view of all 3 impingers, respectively;

FIGS. 7A, 7B, and 7C are a side elevation, a back elevation, and a top plan view of the penthouse plenum an cyclonal chamber, respectively;

FIG. 8 is an axiometric internal drawing of all of the motors and parts of the dehydrator module excluding the filters and external sheet metal;

FIG. 9 is a cross section of the dehydrator module;

FIG. 10 is an axiometric drawing of the demister assembly and filters;

FIG. 11 is a breakout axiometric view of the dehydrator filter matrix;

DETAILED DESCRIPTION

The invention is directed at air pollution abatement wherein it is necessary to clean polluted or contaminated air being emitted from a combustion or a processing source in which the pollution is suspended within the gases. e.g. aerosols, particulates and toxic materials.

Figure 1:
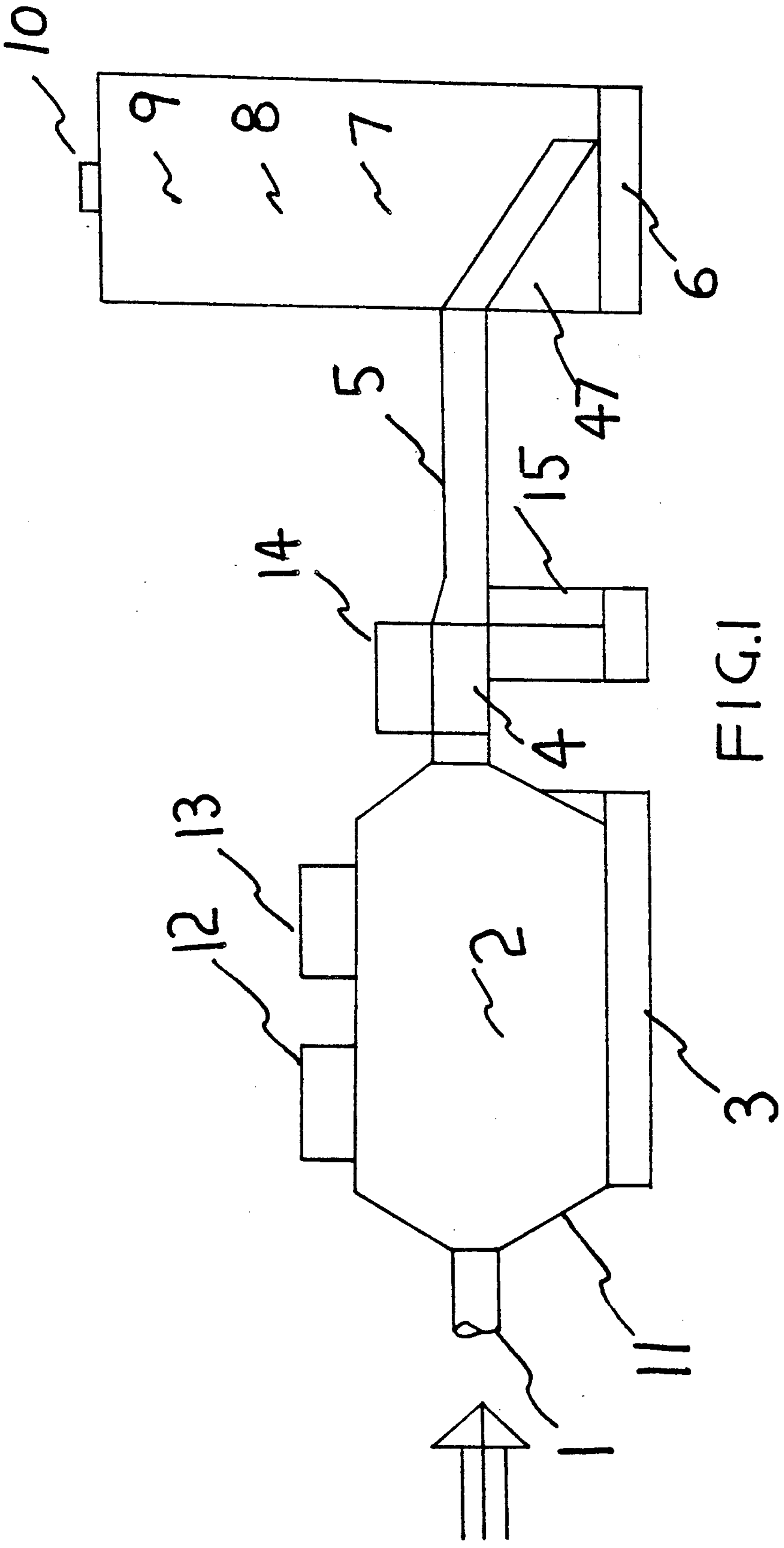
FIG. 1 is a side elevation showing the entire architecture of the system from polluted gas entry through all phases of scrubbing, washing and extracting to exhausting.

In FIG. 1, a system overview shows entry air or gas entering through (1) into (2) the primary impinger chamber with fluid supply and settling tank (3). The scrubbed air or gas is pulled through the primary impinger chamber by (4) a rotary turbine impeller and excess fluids are then eliminated by (5) the turbo impinger section. Gas then enters (6) the centrifuge with its self contained fluid supply and settling tank (7). After ascending air or gas passes through the centrifuge it enters (8) a dry plenum duct or penthouse plenum prior to entering (9) the dehydrator module and then exhausting into the atmosphere through (10) the flue stack and exhaust.

Figure 2:
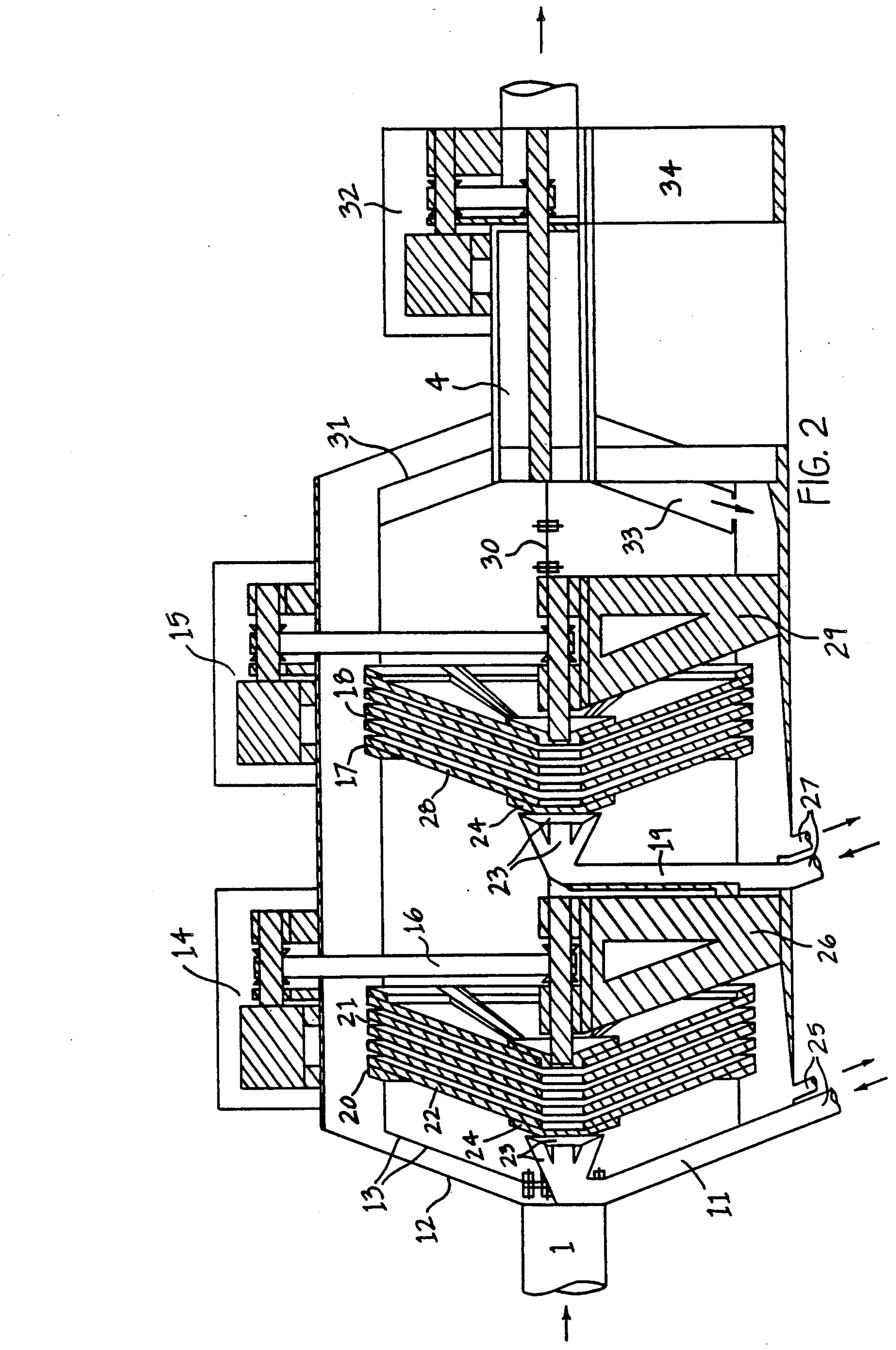
FIG. 2 is a cross section of the primary impinges (chamber) and the impeller.

The gases enter the primary impinger chamber section—refer to FIG. 2—which contains two variable density filter wheels—refer to FIGS. 4 and 5. FIG. 5 shows filter wheel segment that has 5 layers each comprised of 1½ inches of filaments. There is a ½" void between each of the 5 layers. Figure shows 4 voids. Filter layers and voids both extend from hub to rim. Filter density and thickness and void size can be varied depending upon requirements of different applications. The variability of the filter densities may be accomplished due to the following features.

(A) The primary impinger filter wheels allow the fiber (filament) size and densities of filters to be increased or decreased, since they are made in five removable and replaceable segments—refer to FIG. 5. As an example, smaller fiber diameter and higher number of fiber shafts per square inch would increase the density.

(B) The two variable filter wheels may be driven at separate velocities, either synchronously or asynchronously, thus increasing the impingeability or ability to vary the density and impingement while the unit is operating. This maximizes the filters total efficiency wherein it shows the two wheels in tandem and with separate motor drives—refer to FIG. 2.

Figure 3:
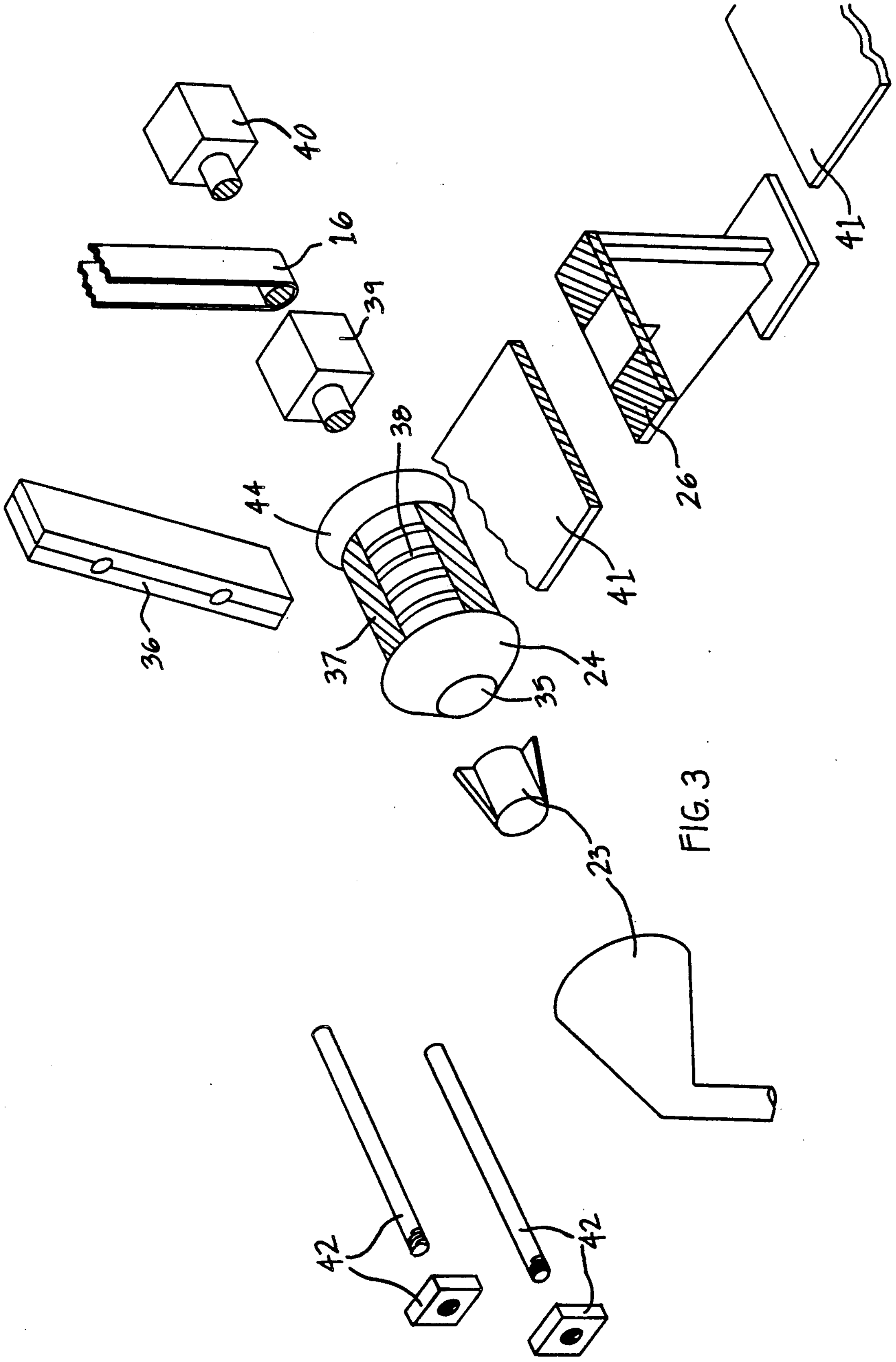
FIG. 3 is an internal exploded axiometric projection of the primary impinger filter wheel hub (2 per chamber) showing rib attachments, shower head (2 per chamber), mounting assembly and partial belt drive (2 per chamber)

(C) Additionally a degreasing solution will be supplied to the two wheels shown in FIGS. 2 and 3. This solution comes from a 200 gallon solution tank which contains a chemical degreasing solution that supplies the two shower heads—refer to FIG. 2, #23 —located in the primary impinger section with a constant flow of biodegradable solution. The actual solution chemistry and temperature may vary depending upon requirements of different applications. The solution tank also contains a motorized pump and settling tanks to separate scum and sediment from the returned solution and allow the recyclable solution to flow back through the shower heads. Sediment and scum removal and solution replenishment will be computer center managed—refer to FIG. 2, #34.

(D) The solution velocity and gallons per minute will also contribute to the filter density and variability by increasing or decreasing the amount of inundation.

The solution when delivered to the shower heads will be directed by a nozzle—refer to FIG. 3, #23 —into the wheel hub tunnel—refer to FIG. 3, #35 —and will be forced out into the segmented filters through linear diffusers in the hub assembly—refer to FIG. 3, #38. The solution will also be directed by the shower head nozzles onto the leading surface splash plates shown in FIG. 2, #24 and FIG. 3, #24.

The filter wheels will impinge the initial polluted gas contaminants and will send the pollutants, e.g. aerosols and particulates, by imparted centrifugal force and velocity, outward from the matrix of the wheels to a collection chamber (cowl)—refer to FIG. 2, #13. The collection chamber is the exterior surface of the cowling which contains all the impingement filter wheels, showers etc. and the outer chamber walls of the primary impinger section. Note that both filter wheels intrude the collection chamber space—refer to FIG. 2, #20 and #17. The impinged material will be flung freely into the outer chamber and will gravitationally flow through return drains—refer to FIG. 2, #25 & #27—back to the solution tank—refer to FIG. 1, #3.

The filter wheels are to be constructed out of molded and extruded polymer based plastics, e.g. nylon, offering a hydrophobic fiber surface which permits continuous cleaning of the fibers by combining the manifestation of gas velocity across the filters with fiber solution inundation and wheel velocities. It should also be noted that a part of the primary filter section is an impeller—refer to FIG. 2, #4—which is designed to maintain the required pressure and gas flow velocities within the primary impinger chamber and up and downstream within the system. All systemic management will be programmed for each separate condition and computer managed. All systems will be hard wired for management and will have the capability of being manually overridden.

ANATOMY OF SYSTEM—FIG. 1

(1) Gas flow entry duct (2) Primary impinger chamber section (3) Primary impinger fluid supply and settling tank section (4) Rotary turbine impeller section (5) Turbo impinger section (6) Centrifuge chamber section (7) Centrifuge fluid supply and settling tank section (8) Penthouse plenum section (9) Dehydrator module section

(10) Flue stack and exhaust section

ANATOMY OF PRIMARY IMPINGER SECTION—FIG. 2

(1) Gas flow entry duct (4) Rotary turbine impeller section with duct shrouding and inner centrifugal suction impeller cylinder wheel.

(11) The filter wheel solution shower supply pipe located inside the chamber wall which travels from the solution tank—refer to FIG. 1, #3.

(12) Primary impinger chamber wall

(13) The cowl. A sheet metal cylinder containing the shower heads and substantially all of the filter wheels running from the gas entry section to the exiting end of the primary impinger chamber. The cowl is contained within the outer impinger chamber walls or is in essence a cylinder within a cylinder.

(14) Filter wheel motor and drive assembly consisting of a 2 hp. electric motor (also FIG. 2, #15), the motor drive with variable velocity, assembly belt drive and motor housing. Motor may be computer managed.

(15) Refer to FIG. 2, #14

(16) Belt drive for first filter wheel made of chemically inert plastic and capable of withstanding high internal temperatures.

(17) Refer to FIG. 2, #20

(18) Refer to FIG. 2, #21

(19) Refer to FIG. 2, #11

(20) Filter wheel rim in cavity. The filter wheel rim depicted shows how the wheels partially enter the cavity between the cowl and the primary impinger chamber walls for depositing fluids and particulates on outer chamber walls.

(21) Filter stratified cavities. The cavities are stratified between the five filter brushes allowing the impinged particulates, aerosols, oils, grease and other substances to be trapped in the brushlike filter fibers and gradually migrate through the manifestations of gas pressure, flow rate, centrifugal velocity and force. The degreasing solution flow to these cavities provides rapid transportation of the impinged materials out of the filter matrix. It is then deposited on the external walls of the impinger chamber.

(22) Primary impinger filter wheel

(23) Solution shower head and directional nozzle. The shower head as shown has two directional nozzles capable of directing the solution onto the leading surface splash plate and into the hollow hub.

(24) Leading surface splash plate

(25) Solution reticulation showing supply and return of degreasing solution.

(26) Structural assembly for filter wheel made from heavy gauge metal welded and bolted where necessary.

(27) Refer to FIG. 2, #25

(28) Refer to FIG. 2, #22

(29) Refer to FIG. 2, #26

(30) Primary impinger housing, seam and bolting. The primary impinger housing will be constructed of heavy gauge sheet metal and split into an upper and lower section with a bolted down neoprene gasketed seem running the full length and breadth of the housing. This seam also provides access to all moving parts for maintenance and for cleaning.

(31) Exit end vanes and structural elements. These vanes are located at the exit end of the primary impinger chamber and additionally aid in moisture removal as well as provide the chamber with structural integrity.

(32) Impeller section motor drive and assembly—2 hp. electric—with housing. Motor may be computer managed.

(33) Exit end solution return drain.

(34) The control center and structure. The control center itself is to contain all electrical wiring interfaces and breaker systems, monitoring equipment and computer interface modem. The cabinet also will act as a structural member to support the weight of the impeller housing and turbo impingers.

ANATOMY OF PRIMARY IMPINGER SECTION—FIG. 3

(16) Driven gear and belt. As shown in FIG. 2, the gears and belts are driven by a top mounted 2 hp. electric motor located in a sealed housing so as to contain the gases and solution from the primary impinger chamber.

(23) The solution shower head and nozzle. The shower head is supplied with a degreasing solution with flow rate being controlled by a computer managed motorized pump within the solution tank.

(24) The forward surface splash plate. This plate provided for even distribution of the solution from hub to rim by permitting the shower head nozzle to direct the solution at the splash plate while the filter wheels are rotating thereby allowing the degreasing solution to inundate the leading surfaces, and like the hub tunnel distribution, aid in the pollutant impingement and disposition. This action also keeps the fiber surfaces cleaned continuously.

(26) Vertical bearing assembly for filter wheels and motor drive. (Both wheels)

(35) Hollow hub tunnel. This allows nozzle injected fluids to enter the hollow hub and reach the linear diffusers.

(36) Filter wheel rib example. There are five ribs per wheel. These ribs are made of molded polymer plastic and are designed to allow the five segmented filters to be easily removed and replaced. There are two bolts per rib holding the segments in place.

(37) Filter wheel hub. Cross section shows where filter wheel rib attaches to hub.

(38) Linear diffusers. Distributes fluids centrifugally outward into and onto filter wheel filaments.

(39) Bearing blocks (Both wheels)

(40) Refer to FIG. 3, #39

(41) Horizontal wheel assembly structure. (Both wheels) This element runs horizontally across the primary impinger chamber and is fastened to both sides of the chamber. The center vertical element—refer to FIG. 3, #26—is for the mounting of the filter wheel hub and belt driven gear, shaft and bearing assemblies.

(42) Nut and bolt assemblies. These assemblies are designed to contain the filter segments within the wheel geometry.

(44) Flange plate. Integral part of wheel hub which provides support to the filter wheel.

ANATOMY OF PRIMARY IMPINGER SECTION—FIGS. 4A, 4B

(24) The forward surface splash plate. This plate provided for even distribution of the solution from hub to rim by permitting the shower head nozzle to direct the solution at the splash plate while the filter wheels are rotating thereby allowing the degreasing solution to inundate the leading surfaces, and like the hub tunnel distribution, aid in the pollutant impingement and disposition. This action also keeps the fiber surfaces cleaned continuously.

(35) Hollow hub tunnel. This allows nozzle injected fluids to enter the hollow hub and reach the linear diffusers.

(36) Filter wheel rib example. There are five ribs per wheel. These ribs are made of molded polymer plastic and are designed to allow the five segmented filters to be easily removed and replaced. There are two bolts per rib holding the segments in place.

(43) Cross section of where drive shaft connects with rear flange plate.

(44) Flange plate. Integral part of wheel hub which provides support to the filter wheel.

(45) Segment of primary impinger (filter) wheel. Wheels are to be made from molded polymer plastic. Refer to FIG. 5

ANATOMY OF PRIMARY IMPINGER SECTION—FIG. 5

(21) The filter spaces. These spaces are located evenly between the five layers of fibers.

(36) Filter wheel rib example. There are five ribs per wheel. These ribs are made of molded polymer plastic and are designed to allow the five segmented filters to be easily removed and replaced. There are two bolts per rib holding the segments in place.

(46) Filter wheel layer comprised of brush-like filament (fiber) shafts aligned in a parallel matrix. Filaments are secured at rim end into individual rows (running around circumference from rib to rib) with a rigid laminated border. For this design purpose the filament shafts are ⅛" in diameter with a 1/16" space between the filament surfaces when viewed cross-sectionally and placed in a checkerboard design. To assure impingement of all particulates and aerosols, the brush densities may be altered from case to case, as an example, smaller fiber diameter and higher number of fiber shafts per square inch would increase the density. Fibers are extruded from polymer based plastic dope. The fiber geometry or density must be kept consistent from hub to rim of an individual filter wheel in order to maintain equal pressure and gas flow through any part of the entering surfaces to the rear surfaces of the two impinger wheels.

Note: In the closing paragraph on the primary impinger section, the impeller was mentioned. This is shown in FIG. 2 with its own 2 hp. electric motor and belt drive.

After the gases have been treated and scrubbed in the primary impinger section, the gases will be driven into the turbo impinger chamber section. These three polymer plastic tubes are contained within the circular sheet metal chamber ducts and are supported on individual bearings so as to be able to freely rotate within the chambers. The impinger tubes are then passively rotated by the upstream gases. The gases travel through the turbo impinger tubes and cause them to rotate by traveling over the coiled inner-vaned surfaces designed to impart rotational velocity. The wet gases will be rotated by the impingers extracting the moisture and causing it to be forced through the openings on the impinger wall surfaces and trapped on the inner chamber walls for gravitational return to the solution tank—refer to FIG. 1, #3—by way of a sloping drain beneath each of the three impingers.

ANATOMY OF TURBO IMPINGER CHAMBERS—FIGS. 6A, 6B, 6C

(47) Turbo impinger distribution plenum. This plenum distributes the treated gases and causes equal distribution to the three turbo impingers.

(48) The 3 side-by-side turbo impinger chambers. These chambers house the 3 plastic turbo impinger tubes.

(49) Collection plenum. This plenum consolidates the treated gases and causes a convergence of the gases for the next treatment section.

(50) Upstream end view of the 3 turbo impinger ducts and solution return drains.

(51) The return drain

(52) Cross sectional view of turbo impinger (3 per system)

After the turbo impingement the gases will travel downward and enter tangentially a square centrifuge cabinet—refer to FIG. 1, #6. Within the cabinet there is a centrifuge or cylindrical chamber made out of heavy gauge sheet metal. The centrifuge is contained within the square cabinet in a rigid urethane foam insulated matrix. The foam is poured around the cylinder thus imparting structural integrity for supporting the top mounted dehydrator module—refer to FIGS. 8,9,10, and 11. The chamber's inner surface will be painted with a chemical moisture resistive surface and be capable of withstanding temperatures of up to 1000° F. The gases will rise from the bottom entry duct—refer to FIG. 7A, #53—and then will be showered with water or other chemicals when specifically necessary. The shower/mister will act as a gas saturator/scrubber, removing whatever aerosols or particulates that may not have been removed by the primary impinger section. The percentage of saturation will be determined on a case by case basis. The fluid will be supplied from a 100 gallon tank beneath the centrifuge—refer to FIG. 1, #7 and FIGS. 7A and 7B, #7. As in the primary impinger section, the scum, sediment and water supply management will be computer managed.

After leaving the centrifuge, the gases will enter the penthouse plenum. Since it is located at the top of the centrifuge and beneath the dehydrator module, this plenum provides the ability for makeup air to be added or blended to the internal gas flow and maintain an even gas flow throughout the entire system. The air intake damper is computer managed.

ANATOMY OF CENTRIFUGE AND PENTHOUSE PLENUM—FIGS. 7A, 7B, 7C (6) Centrifuge chamber. A circular chamber causing the gases to rotate cyclonically and rise toward the chamber top. During this passage the gases will be saturated with water or other necessary chemicals.

(7) Fluid supply and settling tank. Located beneath the centrifuge section, this tank supplies the fluid to the mister shower within the centrifuge. It also acts as a collector of scum and sediment. It contains a motor driven, variable speed pump and is computer managed.

(8) Penthouse plenum section

(53) Gas delivery duct entering the centrifuge tangentially.

(54) Centrifuge shower mister head and supply line. The shower head will be adjustable and will provide a wide saturation range capability from deluging to misting. Supply line brings fluids up by pump from fluid supply and settling tank.

(55) Top view of centrifuge cabinet looking through the penthouse plenum.

(56) Fresh air intake damper—makeup air supply.

(57) Dehydrator module and plenum interface. The dehydrator module with electrostatic manifestation is the last process of the system. The gases are then passed up to the dehydrator through a tunnel in which there is mounted a motorized spin vane. This spin vane can cause the gases to move more rapidly through the dehydrator module, depending upon current requirements (% of moisture removal). The spin vane motor drive is a 1 hp. electric motor located above the spin vane and its velocity will be computer managed—refer to FIG. 8, #62 and FIG. 9, #62.

The gases are blown tangentially from the spin vane into a slower rotating 4' high and 4' diameter drum-shaped matrix of fibers shown in FIG. 11. The filter matrix is attached to the filter drive assembly by adhesive welding. The drum-shaped filter matrix and assembly may be rotated by the filter matrix drive motor at variable velocities, depending upon need, and will be computer managed. The filter matrix will rotate directionally with the inner rotating spin vane. The fibers in the filter matrix are polymer plastic and are ⅛" in diameter and arranged so that the 8″ fibers run from the inside surface to the outside surface. This slower moving filter matrix provides two functions. (1) The moisture is impinged in the lower chamber and transferred from the inside of the matrix to the outside centrifugally, allowing it to travel longitudinally along the fiber shafts. It is then flung off onto the module chamber walls and returned to the solution/water tank beneath the centrifuge by gravitational flow. (2) The rotating matrix also generates static electricity which will impinge particles that may still be present in the gas stream.

A demister—refer to FIG. 10—is a "cap" of 6 inch thick fiber matrix using the same $\frac{1}{8}$″ fibers. The demister is to cause the entrapment or impingement of the misting that will occur toward the module's exhaust stack and will force the moisture back into the impinger matrix for collection and removal.

ANATOMY OF DEHYDRATOR MODULE—FIG. 8

(58) Transfer tunnel between penthouse plenum and dehydrator module.

(59) Motorized multi-level spin vane.

(60) The filter matrix drive motor. This motor drives the filter matrix assembly which in turn drives the filter matrix attached to it —refer to FIG. 11, #69. Motor may be computer managed.

(61) The filter matrix assembly. This is connected to the filter matrix motor and drives the filter matrix.

(62) Spin vane motor. This drives the spin vane and may be computer managed.

(63) Structural assembly for dehydrator module.

(64) The matrix filter rib (4 per module). The rib assemblies are used to attach the matrix filters.

ANATOMY OF DEHYDRATOR MODULE—FIG. 9

(10) Flue stack and exhaust section (58) Transfer tunnel between penthouse plenum and dehydrator module.

(59) Motorized multi-level spin vane.

(60) The filter matrix drive motor. This motor drives the filter matrix assembly which in turn drives the filter matrix attached to it —refer to FIG. 11, #69. Motor may be computer managed.

(61) The filter matrix assembly. This is connected to the filter matrix motor and drives the filter matrix.

(62) Spin vane motor. This drives the spin vane and may be computer managed.

(63) Structural assembly for dehydrator module.

(64) The matrix filter rib (4 per module). The rib assemblies are used to attach the matrix filters.

(65) Drain outlets for removed solution.

(66) Motor mounting assembly (structural) for dehydrator module.

ANATOMY OF DEMISTER CAP—FIG. 10

(61) The filter matrix assembly. This is connected to the filter matrix motor and drives the filter matrix.

(67) Section of demister cap matrix filter.

(68) Upper rib assembly of dehydrator module. This assembly is used for the demister filter matrix "cap".

ANATOMY OF DEHYDRATOR FILTER MATRIX DRUM—FIG. 11

(64) The matrix filter rib (4 per module). The rib assemblies are used to attach the matrix filters.

(69) Section of filter matrix drum wall

COMPUTER SYSTEMS MANAGEMENT

The system will incorporate the following features.

A. Gas scrubbing

1. Raw gas velocity
2. Primary impinger velocities and pressures (Impellar drive)
3. Saturator managment chemistry
4. Module impinger and spin vane velocity management
5. Module makeup air management
6. Exiting stack air metering
7. System balancing (Damper settings and velocities)
8. Motor drives (Diagnostic)
9. Alarm

B. Aqueous Bio-degradeable Solutions

1. Supply level maintenance
2. Flow metering (Viscosity, pressure)
3. Solution chemistry management
4. Filtration system management
5. Sludge buildup indicator
6. Motor drives (Diagnostic)
7. Alarm System incorporates a graph charting system for operating records (continuous). It also provides a quick visual of all functional systems.

It will be apparent to those skilled in the art, that the specific embodiments disclosed herein are merely examplary of the inventive steps, apparatus and materials contemplated within this disclosure. Accordingly, it is to be understood that such disclosure is by way of example and is not to be construed as limiting beyond the specific restrictions defined in the following claims.

I claim:

1. A method directed at air pollution abatement wherein it is necessary to clean polluted or contaminated air being emitted from a combustion or processing source in which the pollution is suspended within the gases; gases enter the primary impinger chamber which contains two variable size and density filter wheels independently belt driven by electric motors which may be driven at separate velocities, either synchronously or asynchronously; a degreasing solution is supplied to the two wheels from a tank that supplies two shower heads located in the front of each wheel with a variable flow of biodegradable degreasing solution; the solution tank contains a motorized pump which pumps the solution into the shower heads and a settling tank system which separates scum and sediment from the solution and allows the recyclable solution to be pumped back through the shower heads; the filter wheels impinge the initial polluted gas contaminants and send the pollutants by imparted centrifugal force and velocity outwards from the point of impingement on the wheels to a collection chamber; the collection chamber is the exterior surface of the inner shrouding which contains all the impingement filter wheels and showers and the outer chamber walls of the primary impinger chamber; both filter wheels extend into the collection chamber space so that the impinged material will be flung freely onto the outer chamber walls and will gravitationally flow through return drains back to the solution tank; an impeller, driven by a variable speed, electric motor, is located at the end of the primary impinger chamber to maintain the required pressure and gas flow velocities within the primary impinger chamber an up and downstream within the system; the gases that exit the primary impinger chamber enter the turbo impinger chamber for surplus fluid elimination; the gases then enter a centrifuge containing an electrical motor and pump driven shower system which may saturate the gases with water or chemicals using a range of hydration from mist to deluge; as gases then enter the penthouse plenum, it is possible to add outside air for blending in this stage through a motor driven, variable apertured damper prior to the gases entering the dehydrator module; leaving the plenum, the gases pass up the dehydrator through a tunnel in which there is mounted an electrically driven, variable speed, motorized spin vane which moves the gases into the dehydrator module; gases then are blown tangentially from the spin vane into the inner surface of a rotating drum containing monofilaments aligned from the inner surface of the drum wall to the outer surface of the drum and driven by a variable speed, electric motor; this slower moving drum provides moisture impingement and transference from the inside void of the drum wall to the outside centrifugally, allowing moisture and particulates to travel longitudinally along the filament shafts and are then flung off onto the module chamber shrouding wall and returned to a tank beneath the centrifuge by gravitational flow; the rotating drum also generates static electricity which may impinge micron and submicron sized particles that may still be present in the gas stream; a demister cap will cause the entrapment or impingement of misting that may occur toward the module's exhaust stack prior to cleaned gas exiting into the atmosphere; all of the motors within the system may be manually adjusted from the control panel to provide the speeds and settings for a particular set of circumstances and it will also be available with an on-site or remote computer management system that works in the following manner: in each and every case the motors will be connected by a hard wire to the control panel located beneath the impeller and turbo impingers; the control panel will contain standard manual controls and an optional computer interface system; a computer may then be interfaced with the control panel; the computer and its software will provide the ability to increase and decrease the variable motor drives in accordance with the specific software programs.

2. A method as defined in claim 1 wherein it specifically comprises the use of a rotational circular filter wheel which, though circular, is in fact conical and when viewed cross-sectionally, "cants" at a 70 degree angle in relation to the center line horizontal plane of the filter wheel hub.

3. A method as defined in claim 1 wherein it specifically comprises the use of centrifugal force for the removal of the impinged substances from filter wheel segments.

4. A method as defined in claim 1 wherein it specifically comprises the use of a variable flow of degreasing solution that is delivered by way of a front of wheel mounted shower head and directional nozzle; the solution is deposited onto splash plate resulting in flushing the leading surfaces of the wheel and throughout the filter by fluids directed by the directional nozzle into the hollow wheel hub and then passing through the linear open channels around the wheel hub, providing a cleaning and flushing of all the monofilaments.

5. A method as defined in claim 1 wherein it specifically comprises the use of a motorized spin vane with variable gas flow metering.

6. A method as defined in claim 1 wherein it specifically comprises the use of the spin van to direct the flow and rate of flow of moist gas into a rotating impinger filter drum wall.

7. A method as defined in claim 1 wherein it specifically comprises the use of optional computer management; wherein and whereby a remotely placed computer may be used to manage the systems via telephone modem interface or microwave transmission interface.

8. A method as defined in claim 1 wherein it specifically comprises a rotational filter wheel that is conical and circular and contains five segments which are replaceable and interchangeable with segments of greater or lesser filament diameter, size, and density per cubic inch.

9. A method as defined in claim 8 wherein it specifically mentions five segments; the use of continuous polymer based extruded filament shafts in parallel juxtaposition for impingement.

10. A method as defined in claim 1 wherein it specifically comprises the use of filters with stratified cavities; the cavities are located between the layers of filaments in each of the five segments, providing for rapid transportation of the impinged material out of the filter wheels.

11. A method as defined in claim 10 wherein it specifically comprises a method of continuously cleaning the individual fiber shafts and therefore continuously cleaning the five filter segments within the filter wheel.

12. A method as defined in claim 1 wherein it specifically comprises the use of plastic turbo impingers which passively rotate as the gas passes through; the impinger extracts the gas-laden moisture by the use of centrifugal force.

13. A method as defined in claim 12 wherein it specifically comprises three tubes arranged side-by-side which extract the moisture from the gas.

14. A method as defined in claim 1 wherein it specifically comprises the use of a motorized polymer plastic filament filter walled drum on which the moisture is trapped.

15. A method as defined in claim 14 wherein it specifically comprises the use of a motorized polymer plastic filament filter walled drum to centrifugally force the impinged moisture and contaminants to be transferred along the filament shafts for deposit on the dehydrator module shrouding wall.

16. A method as defined in claim 15 wherein it specifically comprises the use of gravitational flow of solution from the dehydrator module inner shrouding wall to the tank beneath the centrifuge.

17. A method as defined in claim 1 wherein it specifically comprises the use of the rotating mass of polymer based filaments constituting the drum wall as a generator of static electricity.

18. A method as defined in claim 17 wherein it specifically comprises the use of the rotating mass of polymer based filaments constituting the drum wall to generate static electricity and impinge micron sized particles.

* * * * *